Patented July 16, 1946

2,403,903

UNITED STATES PATENT OFFICE

2,403,903

MANUFACTURE OF PIPERIDINE DERIVATIVES

Franz Bergel, Nathan Chadwick Hindley, Alexander Lang Morrison, and Heinrich Rinderknecht, Welwyn Garden City, England, assignors, by mesne assignments, to Hoffmann-La Roche Inc., Nutley, N. J., a corporation of New Jersey No Drawing. Application April 8, 1943, Serial No. 482,325. In Great Britain April 27, 1942

7 Claims. (Cl. 260—294)

This invention is concerned with an improvement in or modification of the invention of our specification Serial No. 433,340.

In the aforesaid specification Serial No. 433,340 there is claimed inter alia the preparation of cyclic bases by treating α:α-bis-(β'-halogenalkyl)-aryl-aceto-nitriles with primary amines. These cyclic bases can readily be hydrolysed to the corresponding carboxylic acids by heating with concentrated hydrochloric acid at 130° C. and from these acids the esters can be obtained by any of the usual methods.

In British Specification No. 501,135 which also describes the manufacture of 4-arylpiperidine-4-nitriles the nitriles are obtained by condensing an arylacetonitrile having a free methylene group with an amine of the formula

where X and Y are β-halogenalkyl groups and R is an aryl radical, an alkyl radical, an aralkyl radical, or a cycloalkyl radical, in the presence of an agent capable of splitting off hydrogen halide, and the hydrolysis of the nitriles thus obtained is carried out by heating the nitriles with alcoholic solutions of caustic alkalis at elevated temperatures. The further conversion of the acids to esters by known methods is described.

The object of the present invention is to provide a simple process whereby the esters of 4-arylpiperidine-4-carboxylic acids (which are of well known pharmacological value, exhibiting spasmolytic and analgesic properties) can be prepared from the corresponding nitriles in a single step.

According to the present invention 4-arylpiperidine-4-nitriles are heated at elevated temperatures preferably in a sealed vessel with a mixture of an alcohol, sulphuric acid and water, the amount of water employed being between 0.5 and 2.5 molecular equivalents of the nitrile used. Where ordinary concentrated sulphuric acid (98% sulphuric acid) is used then if sufficient of it is taken to allow for its normal water content of 2% to provide for the necessary molecular equivalent of water, further addition of water is not necessary. If however less sulphuric acid is used, the necessary amount of water must be added to the alcohol and sulphuric acid. The amount of alcohol used is not critical and a convenient amount is 10 molecular proportions for 1 molecular proportion of nitrile.

These results were unexpected as attempts to carry out the alcoholysis of the above 4-arylpiperidine-4-nitriles by the standard methods given in chemical literature were unsuccessful. The methods given in chemical literature for the alcoholysis of nitriles consists in heating the nitrile with an equimolecular proportion of concentrated sulphuric acid and 10 molecular proportions of alcohol at 130-140° in a sealed vessel for several hours (cf. Backunts & R. Otto Ber. 1876, 9, 1590; Spiegel, Ber. 1911, 44, 1115).

We have also found that ammonium chloride may advantageously be added to the mixture of nitrile, sulphuric acid, alcohol and water.

*Example 1.*—5 parts by weight of 1-methyl-4-phenylpiperidine-4-nitrile, 8.7 parts by weight of 98% sulphuric acid, 1.2 parts by weight of water, 1.34 parts by weight of ammonium chloride and 10 parts by weight of absolute ethyl alcohol were heated together in a sealed tube at 140–150° C. for eight hours. After cooling, the contents of the tube were poured on to 100 parts by weight of ice and sufficient caustic soda solution added to make the solution alkaline. The oil left undissolved was extracted with ether, the ether solution dried over anhydrous sodium sulphate, the ether removed and the residual oil distilled at 12 mms. pressure when the ethyl ester of 1-methyl-4-phenylpiperidine-4-carboxylic acid came over at 160–165° C. The picrate formed from this base had a melting point of 189–191° C.

*Example 2.*—5 parts by weight of 1-methyl-4-phenylpiperidine-4-nitrile, 25 parts by weight of 98% sulphuric acid and 10 parts by weight of absolute ethyl alcohol were heated in a sealed tube at 140–150° C. for eight hours. On working up the contents of the tube exactly as described in Example 1 the ethyl ester of 1-methyl-4-phenylpiperidine-4-carboxylic acid was obtained.

We claim:

1. A process for the manufacture of an ester of a 4-arylpiperidine-4-carboxylic acid which comprises heating a 4-arylpiperidine-4-nitrile with a mixture of an alcohol, sulphuric acid and water, the total amount of water being between 0.5 and 2.5 molecular equivalents of the nitrile used, and separating the ester from this reaction mixture after completion of the heating.

2. A process for the manufacture of an ester of a 4-arylpiperidine-4-carboxylic acid which comprises heating a 4-arylpiperidine-4-nitrile with a mixture of ethyl alcohol, sulphuric acid and water, the total amount of water being between 0.5 and 2.5 molecular equivalents of the nitrile used, and separating the ester from this reaction mixture after completion of the heating.

3. A process for the manufacture of an ester of a 4-arylpiperidine-4-carboxylic acid which comprises heating a 4-arylpiperidine-4-nitrile with a mixture of ethyl alcohol, ammonium chloride, sulphuric acid and water, the total amount of water being between 0.5 and 2.5 molecular equivalents of the nitrile used, and separating the ester from this reaction mixture after completion of the heating.

4. A process for the manufacture of the ethyl ester of 1-methyl-4-phenylpiperidine-4-carboxylic acid which comprises heating 1-methyl-4-phenylpiperidine-4-nitrile in a mixture of ethyl alcohol, sulphuric acid and water, the total amount of water being between 0.5 and 2.5 molecular equivalents of the nitrile used, and isolating the ester from the reaction mixture after completion of the heating.

5. A process for the manufacture of an ester of 4-arylpiperidine-4-carboxylic acid which comprises heating a 4-arylpiperidine-4-nitrile with a mixture of an alcohol, sulphuric acid and water in a sealed tube, the total amount of water being between 0.5 and 2.5 molecular equivalents of the nitrile used, and separating the ester from this reaction mixture after completion of the heating.

6. A process for the manufacture of the ethyl ester of 1 - methyl -4-phenylpiperidine-4-nitrile which comprises heating 5 parts by weight of 1-methyl-4-phenylpiperidine-4-nitrile, 8.7 parts by weight of 98% sulphuric acid, 1.2 parts by weight of water, 1.34 parts by weight of ammonium chloride and 10 parts by weight of absolute ethyl alcohol together in a sealed tube at 140–150° C. for 8 hours, and isolating the ester from the reaction mixture after cooling.

7. A process for the manufacture of the ethyl ester of 1 - methyl -4-phenylpiperidine-4-nitrile which comprises heating 5 parts by weight of 1-methyl-4-phenylpiperidine-4-nitrile, 25 parts by weight of 98% sulphuric acid and 10 parts by weight of absolute ethyl alcohol in a sealed tube at 140–150° C. for 8 hours, and separating the ester from the reaction mixture after cooling.

FRANZ BERGEL.
NATHAN CHADWICK HINDLEY.
ALEXANDER LANG MORRISON.
HEINRICH RINDERKNECHT.